(12) United States Patent
Alban et al.

(10) Patent No.: US 7,656,352 B2
(45) Date of Patent: *Feb. 2, 2010

(54) TROPOSPHERE CORRECTIONS FOR GROUND BASED POSITIONING SYSTEMS

(75) Inventors: Santiago Alban, Palo Alto, CA (US); David G. Lawrence, Santa Clara, CA (US)

(73) Assignee: Novariant, Inc., Fremont, CA (US)

( * ) Notice: Subject to any disclaimer, the term of this patent is extended or adjusted under 35 U.S.C. 154(b) by 500 days.

This patent is subject to a terminal disclaimer.

(21) Appl. No.: 11/232,394

(22) Filed: Sep. 20, 2005

(65) Prior Publication Data

US 2007/0063896 A1   Mar. 22, 2007

(51) Int. Cl.
*G01S 3/02* (2006.01)
(52) U.S. Cl. ...................................... 342/458
(58) Field of Classification Search . 342/357.01–357.1, 342/458
See application file for complete search history.

(56) References Cited

U.S. PATENT DOCUMENTS

| | | | |
|---|---|---|---|
| 6,271,788 B1 * | 8/2001 | Longaker et al. | 342/357.03 |
| 2002/0199196 A1 * | 12/2002 | Rabinowitz et al. | 725/72 |
| 2006/0022869 A1 * | 2/2006 | Zimmerman et al. | 342/458 |
| 2006/0214844 A1 * | 9/2006 | Fagan et al. | 342/357.02 |

FOREIGN PATENT DOCUMENTS

WO    WO 9963358 A1 * 12/1999

OTHER PUBLICATIONS

Y.A. Liou, "Scientific Application of GPS in Taiwan", Aug. 10, 2004.*

Kono et al, "Preceise Positioning Of Spacecrafts by Multi-Frequency VLBI", 2003.*

"Falcon Rearch", Feb. 1, 1998.*

Kono, "Precise Position of spacecraft by multi-frequency VLBI",2003, Earth Planets Space.*

Falcon Research, Feb. 1, 1998, Radio Communication Notes.*

Hoshinoo, et al. "Assessment of Atmosheric Delay Correction Models for the Japanese MSAS", 2001, ION GPS 2001.*

Hoshinoo, "Assessment of Atmosphere Delay Correction Model for the Japanese MSAS", 2001.*

Troposheric Delay Estimation for Pseudolite Positioning (GNSS 2004, Sydney) http://www.gmat.unsw.edu.au/snap/publications/wang 10 pages.

Pseudolite Augmentation for GPS Aided Aerial Photogrammetry: An Analysis of Systematic Errors (2004), by Wang, Wang, Kearsley, Lee http://www.gmat.unsw.edu.au/snap/publications/wang; 21 pages.

(Continued)

*Primary Examiner*—Thomas H Tarcza
*Assistant Examiner*—Nga X Nguyen
(74) *Attorney, Agent, or Firm*—Brinks, Hofer, Gilson & Lione

(57) ABSTRACT

Troposphere corrections are provided in a land based transmitter-positioning system. Troposphere delays correct ranges based on X- or ISM-band carrier ranging signals with a modulation rate of the code of at least about 30 MHz. Ground based transmitters transmit non-GPS type ranging signals, and the receivers correct for troposphere delays. Troposphere delay corrections are applied to range estimates on each iteration of an iterative position-fix algorithm. Different models of troposphere corrections in a ground based ranging system may be used.

26 Claims, 5 Drawing Sheets

OTHER PUBLICATIONS

"Pseudolite Applications in Positioning and Navigation: Modeling and Geometric Analysis," by Liwen Dai et al.; School of Geometric Engineering, The University of New South Wales, Sydney Australia; 8 pages located at https://www.gmat.unsw.edu/au/snap/publications/dai_etal2001e.pdf. (2001).

"HAPPI—a High Accuracy Pseudolite/GPS Positioning Integration" Tom Ford, Janet Neumann, Neal Toso, Wally Petersen, Curtis Anderson, Pat Fenton, Tom Holden, Kevin Baritrop http://www.novatel.com/Documents/Papers 12 pages. publication date—Sep. 1996.

"Development and Simulation of a Pseudolite-based Flight Reference System". Masters Thesis by Terry J. Bouska. 2003 https://research.maxwell.af.mil/papers/ay2003/afit/AFIT-GE-ENG-03-03 139 Pages.

"The Role of Pseudo-Satellite Signals in Precise GPS-Based Positioning", by Dai, Rizo, and Wang. 2004. http://www.lsgi.polyu.edu.hk/sTAFF/zl.li/vol_3_1/04_rizos 12 pages.

Excerpt of David G. Lawrence Thesis entitled: "Aircraft Landing Using GPS", pp. 32-36; Sep. 1996.

U.S. Appl. No. 10/909,020, filed Jul. 30, 2004.

* cited by examiner

TROPOSPHERE CORRECTIONS FOR GROUND BASED POSITIONING SYSTEMS

BACKGROUND

The present invention relates to range or position determination. In particular, transmitters, receivers other components and/or methods of operation of a ranging or positioning system are provided.

Global navigation satellite systems (GNSS) allow a receiver to determine a position from ranging signals received from a plurality of satellites. Different GNSS systems are available or have been proposed, such as the global positioning system (GPS), Gallileo or GLONASS. The GPS has both civilian and military applications. Different ranging signals are used for the two different applications, allowing for different accuracies in position determination.

Position is determined from code and/or carrier phase information. A code division multiple access code is transmitted from each of the satellites of the global positioning system. The spread spectrum code is provided at a 1 MHz modulation rate for civilian applications and a 10 MHz modulation rate for military applications. The code provided on the L1 carrier wave for civilian use is about 300 kilometers long. The codes from different satellites are correlated with replica codes to determine ranges to different satellites. Using civilian code phase information, an accuracy of around one or two meters may be determined. Centimeter level accuracy may be determined using real-time kinematic processing of carrier phase information. A change in position of the satellites over time allows resolution of carrier phase ambiguity.

The troposphere affects the transmitted signals of a GNSS system. The troposphere may introduce errors of tens of centimeters. With meter level accuracy, such as the accuracy based on code phase measurements in the GPS system, troposphere effects may be ignored. For greater accuracy, such as associated with carrier phase ambiguity resolution in a differential system, the troposphere effects may be modeled. The models predict delays associated with propagation through the troposphere. The measured ranges are corrected by the troposphere delays, more likely increasing accuracy.

In addition to satellite-based systems, ground-based transmitters may be used for determining a range or position. Land based transmitters may include pseudolites. Pseudolite systems have been proposed for landing aircraft and determining a position of a cellular telephone. Pseudolites typically use GPS style signals or codes. Pseudolite systems which use signals similar to GNSS may be limited to several meters of accuracy if the position solution is based on uncorrected code phase measurements. Troposphere corrections may be applied to the GPS type pseudolite signals to increase accuracy. For centimeter level accuracy with pseudolites, troposphere corrections are more important.

BRIEF SUMMARY

The present invention is defined by the following claims, and nothing in this section should be taken as a limitation on those claims. By way of introduction, the preferred embodiments described below include methods, computer readable media and systems for troposphere corrections in a land based transmitter positioning system. Troposphere delays correct ranges based on X- or ISM-band carrier ranging signals with a modulation rate of the code of at least about 30 MHz. Ground based transmitters transmit non-GPS type ranging signals, and the receivers correct for troposphere delays. Troposphere delay corrections are applied to range estimates on each iteration of an iterative position-fix algorithm. Different models of troposphere corrections in a ground based ranging system may be used.

In a first aspect, a method is provided for troposphere corrections in a positioning system with a ground-based transmitter. A range is estimated as a function of a signal from the ground-based transmitter. The signal: a) has an X-band or ISM-band carrier frequency; b) has a modulation rate of code being at least about 30 MHz; or c) has both the X-band or ISM-band carrier frequency and the modulation rate of the code being at least about 30 MHz. A troposphere correction is applied to the range.

In a second aspect, a computer readable storage medium has stored therein data representing instructions executable by a programmed processor of a receiver for troposphere corrections in a positioning system with a ground-based transmitter. The storage medium includes instructions for: estimating a range as a function of a signal from the ground based transmitter, the signal having an X-band or ISM-band carrier frequency and a modulation rate of code being at least about 30 MHz; and applying a troposphere correction to the range.

In a third aspect, a method is provided for troposphere corrections in a positioning system with a ground-based transmitter. A range is iteratively estimated as a function of a signal from the ground-based transmitter. In each iterative estimate of position, the ranges are corrected for troposphere delays.

In a fourth aspect, a computer readable storage medium has stored therein data representing instructions executable by a programmed processor of a receiver for troposphere corrections in a positioning system with a ground based transmitter. The storage medium includes instructions for: estimating a range from a signal from the ground based transmitter, the estimating being in a first pass as a function of a first position guess; calculating a first troposphere correction as a function of the first position guess; correcting the range in the first pass as a function of the first troposphere correction; determining a second position guess as a function of the range in the first pass; estimating the range in a second pass as a function of the second position guess; calculating a second troposphere correction as a function of the second position guess; and correcting the range in the second pass as a function of the second troposphere correction.

In a fifth aspect, a system is provided for troposphere corrections in a positioning system. A first ground-based transmitter is operable to transmit a first ranging signal. A reference receiver is operable to receive the first ranging signal and operable to determine a first reference range as a function of the first ranging signal. A mobile receiver is operable to receive the first ranging signal and operable to determine a first mobile range as a function of the first ranging signal. The mobile receiver is operable to apply a troposphere correction to the first reference range and the first mobile range, a differential range between the first reference range and the first mobile range, or combinations thereof.

Further aspects and advantages of the invention are discussed below in conjunction with the preferred embodiments. The further aspects and advantages may be later claimed independently or in combination.

BRIEF DESCRIPTION OF THE DRAWINGS

The components and the figures are not necessarily to scale, emphasis instead being placed upon illustrating the FIG. 1 is a graphical representation of one embodiment of a local positioning system with GNSS augmentation in an open pit mine.

DETAILED DESCRIPTION OF THE DRAWINGS AND PRESENTLY PREFERRED EMBODIMENTS

A non-typical GNSS band or ground-based transmitter positioning system uses troposphere corrections. The troposphere corrections are applied iteratively to range estimates. Since ground-based transmitters are relatively close to the receivers as compared to GNSS systems, the position and ranges are estimated iteratively to account for non-linearity. The troposphere corrections are also applied iteratively.

Figure 1:
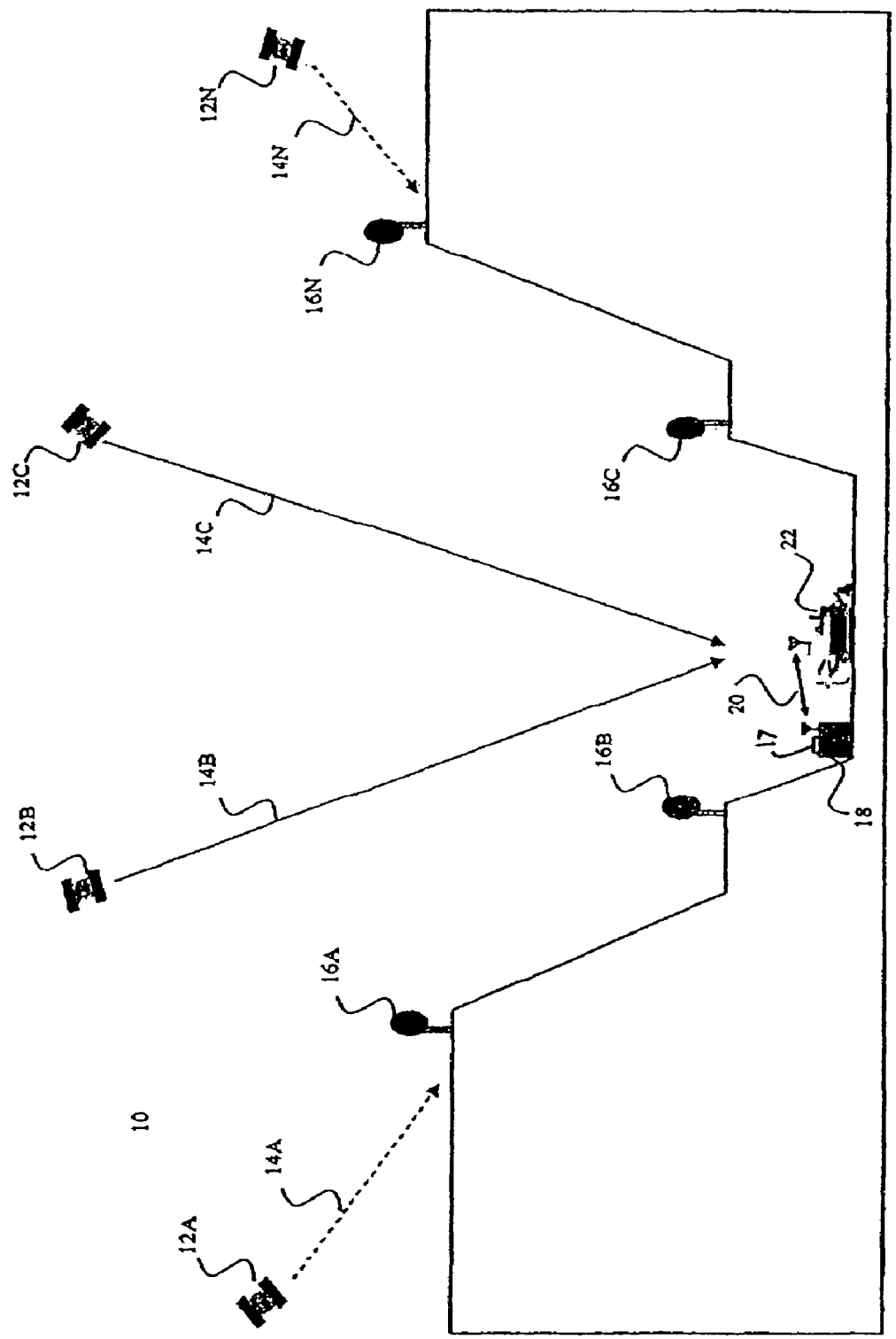

FIG. 1 shows a system 10 for troposphere corrections in a local positioning system. GNSS relies on access to a plurality of satellites at any given location on the globe. For example, access to at least five satellites allows for position solution with carrier phase based centimeter accuracy. Some locations lack sufficient access to satellites. For example, FIG. 1 shows the system 10 with a plurality of satellites 12A-N relative to an open pit mine. A reference station 18 and mobile receiver 22 have lines of sight 14B, 14C to two satellites 12B, 12C but the walls of the mine block access to signals from other satellites 12A, 12N. In order to provide accurate positioning, a plurality of ground-based transmitters 16A-N are positioned within, encircling, around, or combination thereof the mine.

The local ranging signals and positioning system 10 may be used in many different environments. In the example of FIG. 1, the local positioning system is used in an open pit mine. Another use of the local positioning system is within a construction site. Another use for the local positioning system is within a city ("Urban Canyon"). Yet another use for the local positioning system may be within a warehouse or manufacturing plant for automatic guidance of vehicles to control inventory or for assembly line robot positioning. Race cars, vehicles or animals on a race track may be tracked. Contestants, or objects (e.g., a ball) may be tracked where a local positioning system 10 is set up within a stadium. Cameras may be automatically tracked and guided within the stadium. Other completely enclosed or locations associated with one or more man made or natural walls may take advantage of the local positioning system. Forest regions or jungles, such as a forested area being used for seismic studies, may also benefit from a local positioning system with ranging signals that penetrate foliage where GPS signals may not. The local positioning system may alternatively be used in open areas, including small areas or areas over many miles, to augment or replace GPS for more accurate positioning.

The ground-based transmitters 16, reference station 18 and/or mobile receiver 22 are a local positioning system, such as any of the local positioning systems described in U.S. Pat. No. 7,339,525 (Publication No. 20060022870 (application Ser. No. 10/909,020)), the disclosure of which is incorporated herein by reference. The local positioning system is operable without the satellites 12, but may be augmented with the satellites 12. Additional, different or fewer components may be provided, such as providing a greater or less number of ground-based transmitters 16. As another example, the local positioning system may use a mobile receiver 22 without a reference station 18. A receiver 18, 22 may use signals from the local positioning system to determine a position or range. For example, the range from any one or more of the ground-based transmitters 16 to either the reference station 18 or the mobile receiver 22 is determined. A position may be determined from a plurality of ranges to other ground-based transmitters 16. Using the reference station 18, additional accuracy in determining the position of the mobile receiver 22 may be provided.

The ground based transmitters 16 include one or more antennas, a code memory or generator, mixers, filters, clocks, phased-locked-loops, voltage controlled oscillators, radio modems and/or other components for generating the transmit signals described herein. In one embodiment, the ground-based transmitters 16 is one of the transmitters described in U.S. Pat. No. 7,339,525 (Publication No. 20060022870 (application Ser. No. 10/909,020)), the disclosure of which is incorporated herein by reference. Other now known or later developed ground-based transmitters, such as pseudolites, may be used.

The ground-based transmitters 16 are positioned at any of various locations within or around the mine or other location. The ground-based transmitters 16 include transmitters on poles, towers, directly on the ground, on stands, or other locations where the transmitter is maintained in a substantially same position relative to and adjacent to the ground. The ground-based transmitters 16 are positioned such that most or all locations in a local area, such as the mine, have line-of-sight access to four or more ground-based transmitters 16. Access to a fewer number of transmitters may be provided.

The ground-based transmitters 16 transmit ranging signals. In one embodiment, the local positioning system uses GNSS, such as GPS, ranging signals for determining the position of the mobile receiver 22. For example, the ranging signal is transmitted at the L1, L2, or L5 frequencies with a direct-sequence, spread spectrum code having a modulation rate of 10 MHz or less. A single cycle of the L1 frequency is about 20 centimeters in length, and a single chip of the spread spectrum code modulated on the carrier signal is about 300 meters in length. The code length is about 300 kilometers. The transmitters 16 continuously transmit the code division multiple access codes for reception by the receivers 18, 22. In the absence of movement by the mobile receiver 22, integer ambiguity of the carrier phase may be unresolved. As a result, code based accuracy less accurate than a meter is provided using GPS signals. Given movement of the mobile receiver 22, carrier phase ambiguity may be resolved to provide sub-meter or centimeter level accuracy.

Figure 2:
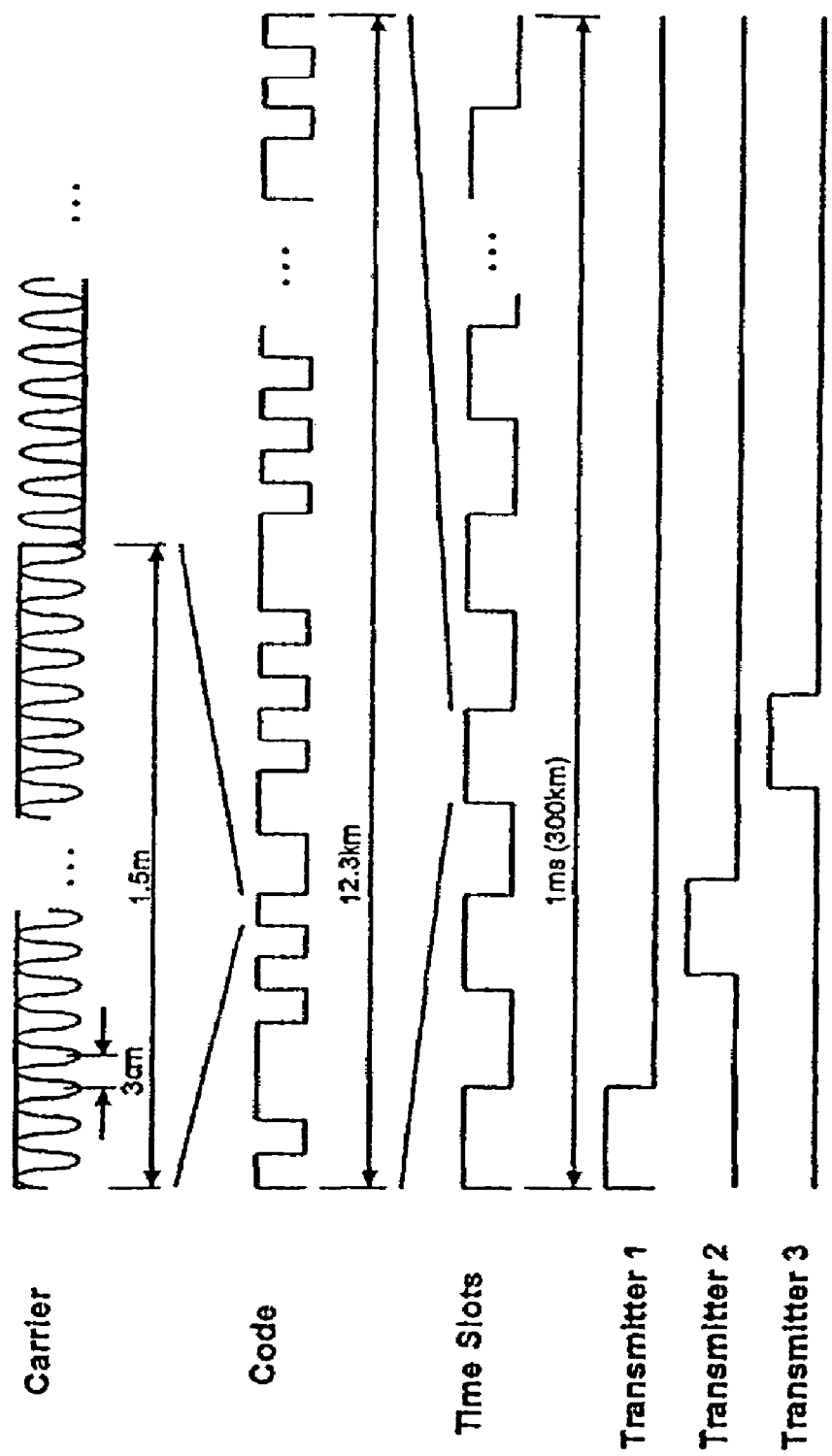
FIG. 2 is a graphical representation of one embodiment of characteristics of a code and carrier of radio frequency ranging signals for a ground-based transmitter.

In an alternative embodiment, different ranging signals are transmitted by the transmitters 16 and used by the local positioning system 10. FIG. 2 shows one embodiment of a ranging signal. The carrier wave or frequency of the ranging signal is in the radar, L-, S-, X- or ISM-bands. The X-band is generally designated as 8,600 to 12,500 MHz, with a band from 9,500 to 10,000 MHz or other band designated for land mobile radiolocation, providing a 500 MHz or other bandwidth for a local transmitter 16. In one embodiment, the carrier frequency is about 9750 MHz, providing a 3 centimeter wavelength. The ISM-bands include industrial, scientific and medical bands at different frequency ranges, such as 902-928 MHz, 2400-2483.5 MHz and 5725-5850 MHz. The frequency and the bandwidth may be limited by government regulatory constraints. Other factors that affect the frequency and bandwidth include signal propagation properties. Different frequency bands for the carrier wave may be used, such as any microwave frequencies, ultra wide band frequencies, GNSS frequencies or other RF frequencies.

The ranging signals have a Direct-Sequence Spread Spectrum (DSSS) code. For example, a direct sequence code such as a Maximal Length Linear Finite Shift Register (MLFSR), a Gold or other pseudo-random noise (PN) code is provided. Other codes may be used. The code is modulated with a carrier at a modulation rate. For DSSS codes, the modulation rate is called the chipping rate. The modulation rate of the code is at least 30 MHz, at least 60 MHz, at least three times a GNSS modulation rate, at least about 150 MHz or other modulation rate. Given high bandwidth available at the chosen carrier frequency, greater or lesser modulation rates may be provided, such as 200 MHz. In one embodiment, the modulation rate is less than 250 MHz. Greater modulation rates may be used, such as rates categorized under Ultra Wide Band regulation. Given a 200 MHz modulation rate of the code, the width of each chip is 1.5 meters. In yet another alternative embodiment, a modulation rate of the code less than 30 MHz, such as 10 MHz or fewer, is used. The modulation rate is the same for each of the transmitters. The code used by each transmitter may be the same or different. In alternative embodiments, the modulation rate may also be different or the same for different transmitters.

The accuracy of the system to a first order is proportional to the code modulation rate. The rate is provided as high as possible to meet the desired accuracy but bounded by the available bandwidth, carrier frequency, hardware and other constraints. The modulation rate is below or equal to the carrier frequency. In one embodiment, the nominal modulation rate is set to half of the available bandwidth, but may be greater and filtered to meet constraints of the available bandwidth, or lesser. The high bandwidth or modulation rate of the code may provide code-based accuracy for range or position less than one wavelength of an L1 or L2 GPS frequencies. The accuracy of a signal is the accuracy of a measurement of the signal made by a receiver 18, 22. The accuracy is sub-meter, such as being better than 19 or 24 centimeters. In one embodiment, the code-based range accuracy is better than 4 centimeters.

In one method, accuracy is calculated with RMS code tracking errors. The RMS code tracking error for a single ground-based transmitter 16 is computed from the radio navigation signal power present at the input terminals of a receiver. The ranging signal in one example is a pseudo random Binary Phase Shift Key (BPSK) signal centered at 9,750 MHz with a modulation rate of 30 million chips per second, so that the length of one chip in space is about 10 meters, and a peak transmit power of 1 Watt. The ranging signal is pulsed on and off in a duty cycle of 4 percent. A plus 10 dBIC gain Right Hand Circularly Polarized (RHCP) transmit antenna and a 0 dB gain RHCP receive antenna are assumed. The propagation environment is assumed to be free space with a maximum distance of 15 kilometers. Using a Friis transmission formula, the power available to the receiver is −110 dBm. The RMS code tracking jitter with the input power level of −110 dBm is computed. X-band receiver noise is assumed to be about 4 dB, resulting in a −170 dBm/Hz of the thermal noise power at the receiver input. The Delay Lock Loop (DLL) loop bandwidth is assumed to be 10 Hz, the predetection integration time is assumed to be 40 microseconds, the correlator chip spacing is assumed to be one chip, and no carrier smoothing is implemented. The RMS code tracking error resulting from these assumptions is 3.2 centimeters, or about 1/300 of the length of a single code chip. This fraction (1/300 of a single code chip) is one way to quantify the accuracy of a code signal. The 3.2 centimeters provides the 1-standard-deviation (1-Sigma) error on range for one transmitter 16. Accuracy is provided for 1-standard-deviation or better, such as 2- or 3-standard-deviations (e.g. 2-Sigma, 3-Sigma), but not worse, such as less than 1-standard-deviation. To estimate accuracy for a three-dimensional position solution, the 1-Sigma error is multiplied by the Dilution of Precision (DOP). Assuming a worst case DOP of 4.0, a 1-Sigma position error of 12.8 centimeters is provided. 12.8 centimeters is well within one wavelength of a GPS carrier. Better than 12 cm position accuracy may be provided.

The accuracy was calculated above based on a number of assumptions and a particular ranging signal. Other ranging signals may be used with the same or different accuracy and using different assumptions. Using only a code phase measurement of the ranging signals shown in FIG. 2, centimeter level or sub-meter level position accuracy may be provided. When computed for a modulation rate of 200 MHz with the same assumptions, about 8.6 millimeters code phase accuracy is provided.

The ranging signals are further characterized by the length of the code. The local positioning system is operated within a region. The chip width and code length are set as a function of a longest dimension over which a ranging signal from a particular ground-based transmitter 16 will traverse within the region of operation. In one embodiment, the chip width in space is much shorter than up to approximately equal to the longest dimension of the region of operation. In the embodiment shown in FIG. 2, the chip width is 1.5 meters, less than ten meters, or another value much less than the longest dimension of a likely region of operation. In one embodiment, the code length in space is approximately equal to or slightly longer than a longest dimension of the region of operation. In another embodiment, the code length may be shorter. For example, the longest dimension of the region of operation is 10 kilometers in an open pit mine. The length of a 10 km code in bits at a 200 MHz chip rate is 10 km*200 MHz divided by the speed of light, which results in 6667 bits. The nearest easily generated code is 8191 bits long, so the code length in space is lengthened to 12.3 km. A lesser or greater code length may be provided for a 10 kilometer region of operation. Other code lengths may be used for the same sized or other sized regions of operation.

The length of code ensures that each measured code phase defines a unique range within the region of operation. A set of four measured code phases define a unique three-dimensional position and time within the region. The region of operation is the open pit mine or the region of the open pit mine associated with line of sight from a particular ground-based transmitter 16. The region of operation may be the same or different for each ground-based transmitter 16.

Figure 3:
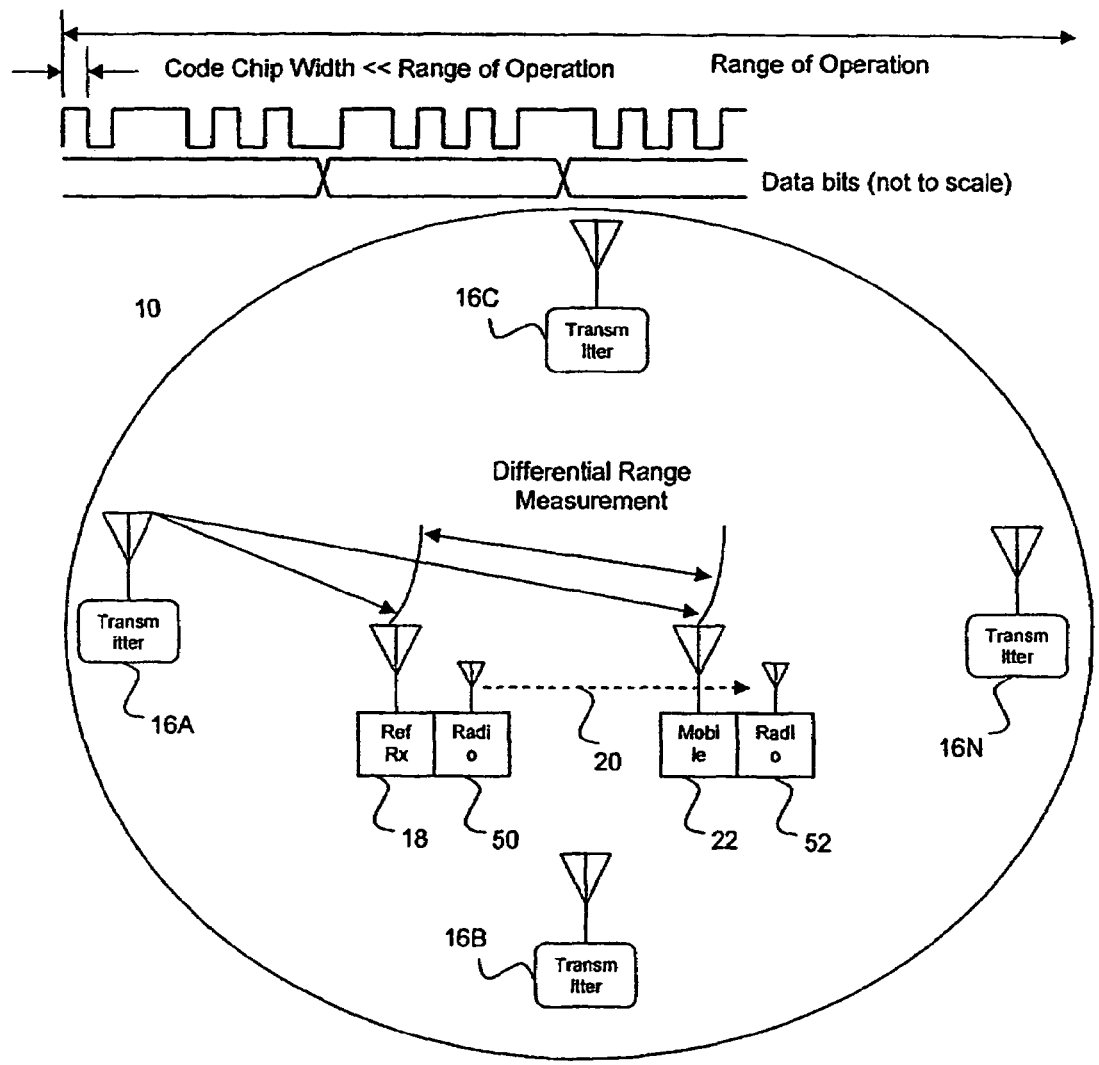
FIG. 3 is a graphical representation of the distribution of local transmitters and receivers for differential positioning in one embodiment.

As shown in FIG. 2, another possible characteristic of the ranging signal for each given transmitter is that the ranging signal is transmitted in a time slot. The ranging signal transmitted in each of the time slots is synchronized to within at least three microseconds of other ranging signals, but longer or shorter periods may be used. The transmitters 16 are synchronized with each other or have asynchronous clocks. Referring to FIG. 3, various transmitters 16, the reference station 18 and the mobile receiver 22 operate as a synchronized local positioning system. The clocks of the various components are synchronized to a master signal by communicating timing information using radio modems 50 and 52 as well as other radio modems associated with the transmitters 16. The timing of various oscillators in a positioning system is addressed either directly by synchronizing the oscillators or indirectly by continuously measuring time differences between different oscillators. In one embodiment, each local transmitter 16 is synchronized to an external source, for example a GNSS signal. In another embodiment, a transmitter 16 is coupled with a local receiver with or without GNSS augmentation.

With synchronized transmitters 16, the relative timing information may be used by the mobile receiver 22 and/or the reference station 18. Using a wireless radio link, such as a 900 MHz radio link, 802.11 or other ISM band radio communications link for the modems 50, 52, differential corrections and other timing information are received from the reference station 18 or other device by the mobile receiver 22. In alternative embodiments, the radio 50 associated with the reference station 18 is instead provided on a transmitter 16. The reference station 18 and transmitter 16 are alternatively connected using a cable, such as a coaxial cable, or other device for transmitting clock information. In yet another alternative embodiment, each of the transmitters 16, reference station 18 and/or mobile receiver 22 are synchronized to the GPS or other GNSS system. Synchronization is achieved via GNSS timing, an RF synchronization pulse, or other signal. Using a change in position of the GPS satellites and/or the mobile receiver 22, integer cycle resolution may be resolved for the GPS signals to obtain relative timing information accurate to sub-nanosecond.

The reference and mobile receivers 18, 22 are one or more receive antennas, analog front ends, filters, amplifiers, mixers, analog-to-digital converters, modulators, processors, combinations thereof, or other now known or later developed navigation receiver. In one embodiment, the receivers 18, 22 are the receivers described in U.S. Pat. No. 7,339,525 (Publication No. 2006002280 (application Ser. No. 10/909,020)), the disclosure of which is incorporated herein by reference. Other now known or later developed receivers may be used.

The mobile receiver 22 is positioned on a piece of equipment, such as a truck, crane, excavator, vehicle, stand, wall, plane, helicopter, balloon, or other mobile or possibly moving piece of equipment or structure. The reference receiver 18 is a ground-based receiver, such as a receiver on a pole, tower, stand, directly on the ground or other position maintained in a substantially same location relative to the ground. More than one reference receiver 18 may be used.

The same type of receiver is used for both the reference station 18 and the mobile receiver 22 in one embodiment, but different types of receivers may be used. Similarly, code generation components of the receiver 18, 22 may be used for generating the ranging signals in the transmitters 16. In one embodiment, the reference receiver 18 is positioned adjacent to or is part of a transmitter 16 (i.e., a transceiver). Multiple transceivers 16, 18 may be provided so that multiple transmitters and co-located reference stations are part of the local positioning system. Alternatively, the reference station 18 is positioned away from any of the transmitters 16.

In one embodiment, the mobile receiver 22 includes one antenna for determining a position. In other embodiments, two or more antennas are provided for determining the relative positions of two components or a position and orientation of a mobile device. The same circuitry may be used for each of the different antennas or separate receivers provided for each of the antennas.

In one embodiment, the receivers 18, 22 are augmented receivers capable of receiving both GNSS and local positioning ranging signals. In alternative embodiments, the receivers 18, 22 include only a local positioning signal path.

The receivers 18, 22 are operable to receive ranging signals from the transmitters 16. The receivers 18, 22 track the code phase of ranging signals in X-band, ISM-band or other frequency bands with a modulation rate higher than GPS signals. The tracking may be performed in environments with high temperature fluctuation or ranges. Signals from multiple transmitters 16 using the same or different codes are received using a same receiver or antenna. For example, time division multiplexing allows use of the same antenna and signals path or receiver. In one embodiment, analog decorrelation and/or down conversion is provided. Given potential modulation rates of 200 or more Megahertz for an X-band ranging signal, analog decorrelation and/or down conversion is performed on the ranging signals received using one analog path.

After analog-to-digital conversion, a back end generates phase measurements for determining a range and/or position. One, two or more different coding schemes may be used, such as a prompt code to detect that a signal exists and a tracking code scheme to provide feedback control or an error signal. In one embodiment, an early-minus-late form of tracking scheme is used where alignment results in a zero error. The carrier signal is tracked with a phase-locked loop to maintain signal tracking. The instantaneous value of the code and carrier NCOs provide the range measurements.

In one embodiment, the accumulated samples and the counts of the oscillators of the carrier and code are output through a processor interface to a processor. The processor implements signal phase tracking pursuant to a signal phase tracking program. The processor controls sub-millisecond interrupts to manage phase tracking. The processor reads the accumulated base band samples for the tracking replica codes. A control signal feedback to carrier and code numerically controlled oscillators maintains tracking of the incoming signals. The phase of the code and carrier numerically controlled oscillators may be sampled at regular intervals and read by the processor. The phases correspond to a measurement of the time of flight of the signal from each transmitter 16 to the receiver or antenna.

The time of flight corresponds to a range (e.g., pseudorange). Different range measurements are performed for the different transmitter 16 and receiver 18, 22 pairs. For example, ranges are determined from four or more transmitters 16 to the mobile receiver 18 and from the four or more transmitters 16 to the reference receiver 18. The ranges are computed from the same ranging signals. For differential or single difference measurements, code phase measurements are made simultaneously or nearly simultaneously at the reference station 18 and the mobile receiver 22. The code phase measurements made by the reference station 18 are broadcast to the mobile receiver 22. The mobile receiver also measures the code phase and computes a differential code phase between the two measured phases.

In one embodiment, the oscillators in the transmitter 16 and receivers 18, 22 are unsynchronized or free running. A phase stability in accord with the accuracy of the system 10 over the measurement period of the receivers 18, 22, such as a period over 1 to 100 milliseconds, is provided for allowing synchronization of asynchronous clocks through the communications with or over the ranging signal path or separate radio modem communications.

Using the signal structure described above with respect to FIG. 2, code phase range and position accuracy better than one wavelength of a carrier of GNSS signals, such as centimeter accuracy, is provided. Accuracy may be improved by providing differential measurements of the ranging signals, particularly in the case of transmitters 16 free of synchronization. For example, the reference station 18 and the mobile receiver 22 both measure a same ranging signal transmitted by a same ground-based transmitter 16. The differential between phase measurements performed by the reference station 18 and the mobile receiver 22 systematically removes the unknown clock of the transmitter 16, as well as other common mode errors possibly including cable and receiver circuitry biases, and results in one unknown time difference between the reference and mobile receivers. Additional differential phase measurements from additional transmitters 16 have the same one unknown time difference between the reference and mobile receivers 18, 22. The fewer unknown variables and reduced common mode errors due to differential phase measurements results in improved accuracy of the mobile receiver 22 relative to the reference. By communicating information on link 20 from the reference station 18 to the mobile receiver 22, additional accuracy in determining a position may be provided.

Accuracy may be further improved by placing the transmitter 16 in a location relative to other transmitters (and satellites) that improves the dilution of precision (DOP). Generally, DOP is improved by placement in a region most orthogonal to other transmitters 16 or satellites 12, as viewed from the receiver 18, 22.

Accuracy is further improved by correcting for troposphere delays. The mobile receiver 22 and/or the reference receiver 18 determine one or more troposphere corrections. The troposphere delays are a function of the altitude of the transmitter 16 and receiver 18, 22, the humidity, the temperature, the pressure or other factors. Any now known or later developed troposphere models may be used, such as the ICD 2000 (e.g., RTCA model or a modified RTCA model), the Hopfield model, or other now known or later developed models of an index of refraction for a signal path. The model outputs a troposphere correction for a given transmitter 16 and receiver 18, 22 pair, for a given transmitter 16, or for a given receiver 18, 20. For differential or single difference measurements, the troposphere correction is based on the reference receiver 18, the mobile receiver 22, or accounts for both receivers 18, 22. Different or the same corrections are used for different epochs.

The mobile receiver 22 or reference receiver 18 applies a troposphere correction to the calculated ranges. For example, the range to each transmitter, a differential range, or combinations thereof is corrected. As another example, the troposphere correction is applied to a double difference range. The double difference range is a function of the ranges between two or more transmitters 16 and two or more receivers 18, 22. The corrections are applied for range calculations by the mobile receiver 22 or by the reference receiver 18 prior to providing information for determining a differential based position. For example, the mobile receiver applies the troposphere correction to a transceiver range or a range between two transceivers (e.g., a transmitter and a reference station).

The troposphere correction is multiplied with the range. For example, troposphere corrections are applied to a pseudorange or difference of pseudoranges as $\delta\rho_{tropo} = (\bar{n} - 1)\rho$, where $\delta\rho_{tropo}$ is the troposphere delay correction, $\bar{n}$ is the average index of refraction along the line of sight between a ground based transmitter 16 and receiver 18, 22, and $\rho$ is the pseudorange or differential pseudorange (i.e., range) based on a recent estimate of the receiver position. Alternatively, other functions may be used.

The receiver 18, 22 is operable to iteratively estimating the range, such as a transmitter 16 to mobile receiver 22 range, a differential range or both. The troposphere corrections are applied to the iterative range estimations. After the first iteration, the processor computes a position based on the ranging signal information. The position is determined as a function of four or more ranges. The mobile receiver 22 may then calculate position based on differential phase measurements. The location of the mobile receiver 22 relative to the reference station 18 is calculated from the differential phase measurements in combination with pre measured relative locations of each of the transmitters 16 to the reference station 18.

Due to non-linearity, the location may be inaccurate. The initial location is determined based on a first estimation of guess of the location. For example, the location is guessed to be at a given transmitter, at a location determined in a previous epoch, at a location indicated by a GNSS position, at a location provided by an inertial positioning system or at another location. If the initial location differs from the first guessed location by a threshold amount, such as a meter, 10 centimeters, a centimeter, a millimeter or other distance, the position is calculated again with the previous iteration location used as the guessed location. After a number of passes, the solution approaches the threshold.

For each iteration, the troposphere corrections are applied to the ranges. The troposphere correction may be location or distance dependent. For each iteration, the troposphere correction is recalculated based on the guessed distance of the receiver 18, 22 from the transmitter 16 or other receiver 18, 22. The recalculated corrections are applied to the previously determined ranges. The newly weighted ranges are used to determine a new position based on the updated location guess.

To determine the location of the mobile receiver 22 relative to a frame of reference other than the local positioning system, the location of each of the transmitters 16 is determined. In one embodiment, the location of each of the transmitters 16 is surveyed manually or using GNSS measurements. Laser-based, radio frequency or other measurement techniques may be used for initially establishing locations of the various transmitters 16 and/or reference station 18. Alternatively, transmitted ranging signals received at two or more other known locations from a given transmit antenna are used to determine a position along one or more dimensions of a phase center of the given transmit antenna.

In one embodiment, the information for the troposphere model, such as humidity, temperature, and pressure are provided via Internet connection, telephone connection or by another remote source. A weather model may be used based on occasionally updated weather information. In another embodiment, one or more weather stations 17 provide information to the local positioning system. For example, the weather station 17 is connected with one or more transmitters 16 or receivers 18, 22. As another example, the weather station 17 is separate from other components. Using a radio modem or other communications, the weather station regularly, such as more frequently than every hour or minute, updates the receiver 18, 22 for calculating troposphere corrections.

The receiver 18, 22 implements the position determination on a programmed processor in response to instructions saved on a computer readable storage medium having stored therein data representing instructions executable by the programmed processor for troposphere correction in ground-based transmitter navigation systems. The instructions implement the processes, methods and/or techniques discussed herein. The memory is a computer-readable storage media or memory, such as a cache, buffer, RAM, removable media, hard drive or other computer readable storage media. Computer readable storage media include various types of volatile and nonvolatile storage media.

The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, filmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given receiver, CPU, GPU or system.

Figure 4:
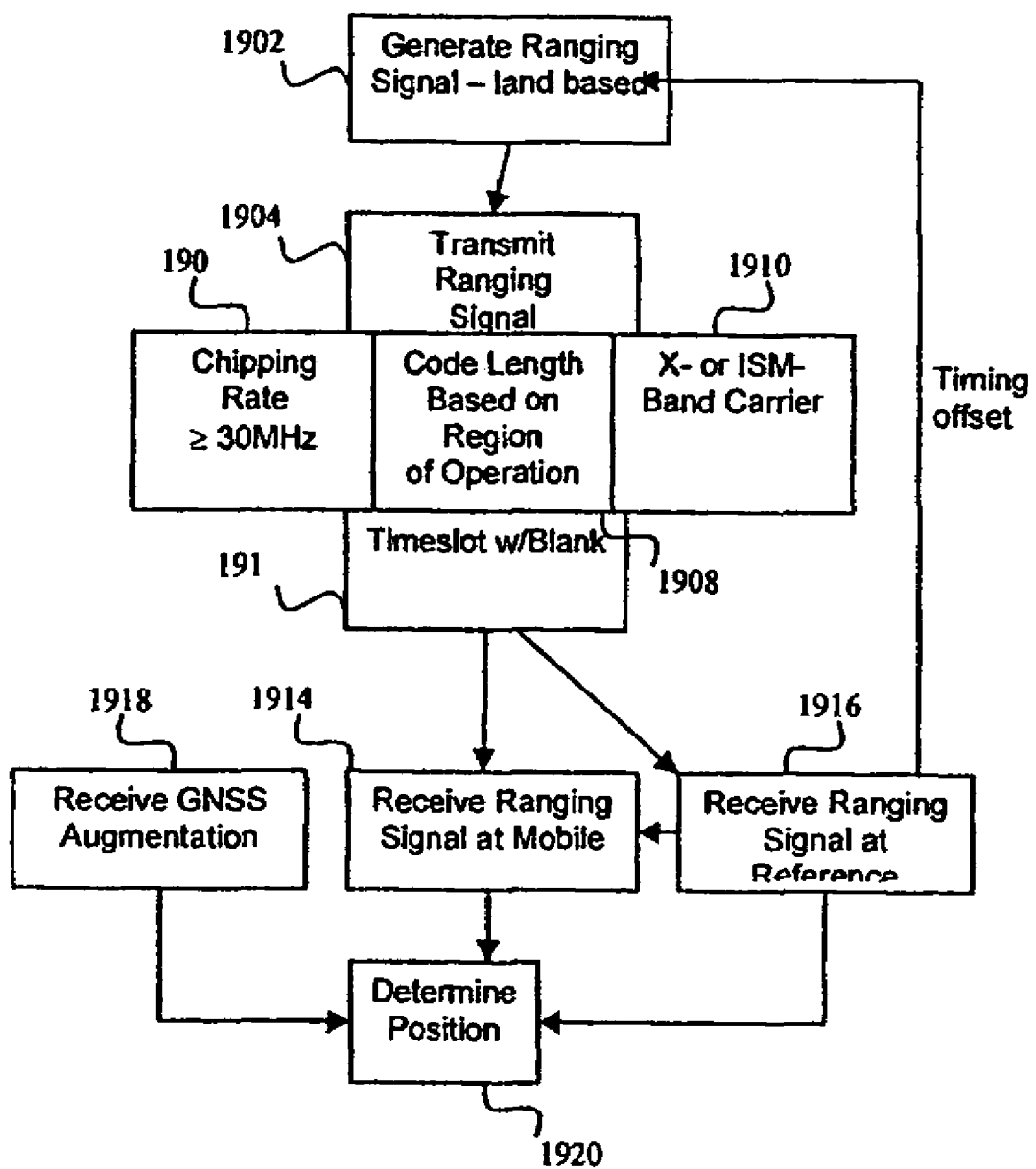
FIG. 4 is a flow chart diagram of one embodiment of a method for position determination with ground based transmitters.

Various embodiments of ground-based ranging or positioning systems are discussed above for troposphere correction. Corresponding methods and alternatives are also discussed above. FIG. 4 shows a flow chart of one embodiment of a method for determining the position of a receiver within a region of operation using a ground-based transmitter. The position is determined from a plurality of ranges corrected for troposphere delays. The method is performed using the systems described above or different systems. Additional, different or fewer acts may be provided, such as not performing the augmentation of act 1918, or the differential positioning of act 1916, or not using one ore more of the characteristics of the transmitted ranging signal of 1906-1912. As another example, a range is determined rather than a determination of position in act 1920.

In act 1902, a ranging signal is generated from a ground-based transmitter. The ranging signal is generated in response to signals from an oscillator. In one embodiment, the oscillator is unsynchronized with any remote oscillator, but may be synchronized in other embodiments. The ranging signal has a code and a carrier wave. The code is generated at a multiple of the frequency of the oscillator, such as a crystal oscillator. A dielectric resonator oscillator is phase locked to the crystal oscillator. The carrier wave is generated as a function of the frequency of the dielectric resonator oscillator. By mixing the code with the carrier wave, the ranging signal is generated. The code may be further modulated with a binary data signal. Other techniques may be used for generating a ranging signal.

In act 1904, the ranging signal with the code and carrier wave is transmitted. After amplification, the ranging signal is applied to an antenna for transmission. A ranging signal has any of the various characteristics identified in acts 1906 through 1912. For example, the ranging signal has a modulation rate of the code of greater than or equal to 30 MHz in act 1906. In one embodiment, the ranging signal has a modulation rate of the code being at least about 50 MHz. A modulation rate of at least about 150 MHz and less than 250 MHz is used in other embodiments.

In act 1908, the code has a code length in space approximately equal to a longest dimension of a region of operation of a local positioning system. For example, the region of operation in space is less than about 15 kilometers. The code length is more or less than the region of operation, such as being slightly longer than the region of operation in space. Other code lengths may be used, such as code lengths less than 10, 5, 1 or other number of kilometers. Greater code lengths may be used, such as code lengths more than twice the longest dimension of a region of operation. Code lengths unrelated to the size of the region of operation may also be provided in alternative embodiments.

In act 1910, the transmitter ranging signals have a carrier wave in the X or ISM-band. For example, the ranging signals are transmitted as an X-band signal with about 60, 100, or up to 500 MHz of bandwidth. Greater bandwidths or lesser bandwidths may be provided. In one embodiment, the bandwidth is about twice the modulation rate of the code. For ISM-band carrier waves, the bandwidth may be less, such as 50 MHZ, 60 MHZ or less.

In act 1912, the ranging signals are transmitted in a time slot with a blanking period. Ranging signals from different ground-based transmitters are transmitted sequentially in different time slots. Each time slot is associated with a blanking period, such as a subsequent time slot or a time period provided within a given time slot. The blanking period corresponds to no transmission, reduced amplitude transmission and/or transmission of noise, no code or a different type of signal. By transmitting the code division multiple access ranging signals in a time division multiple access time slots, a greater dynamic range may be provided. The blanking period is about as long as the code length. The blanking period may have duration substantially equal to the longest code of all of the transmitted ranging signals in a temporal domain. Various time slots and associated transmitters are synchronized to within at least 3 microseconds, but greater or lesser tolerance may be provided. The synchronization for the time division multiple access prevents interference of one transmitter from another transmitter. In alternative embodiments, continuous transmission of code division multiple access signals without time division is used.

Transmission of the ranging signals from each of the different ground-based transmitters is repeated at least 10 times a second or at other repetition periods. Using a number of time slots and blanking periods equal to or larger than a number of ground-based transmitters allows for ranging signals for each of the ground-based transmitters to be detected separately. Alternatively, a fewer number of time slots are provided than ground-based transmitters. Some ground-based transmitters are used for backup purposes and avoid transmission while a different transmitter is using a given time slot.

In act 1914, the local ranging signals are received at a mobile receiver. For example, code division multiple access radio frequency ranging signals in an X or ISM-band are received. Alternatively or additionally, local ranging signals in a GNSS-band are received. The X or ISM-band signals are microwave signals from a ground-based transmitter. The ranging signals are received within a region of operation. The code of the ranging signals has a code length in space at least approximately equal to a longest dimension of the region of operation. For example, a code length for a 10 kilometer region of operation is between about 10 and 15 kilometers. Shorter lengths may be used.

In act 1916, the ranging signals are also received at a reference station or a second receiver spaced from the mobile receiver. The second receiver may be co-located with a ground-based transmitter or spaced from all ground-based transmitters. By receiving the signals at two different locations, a differential position solution may be used.

Where the ranging signals are transmitted with time division multiple access, then the spread spectrum signals are received in time slots. For example, at least four different sets of spread spectrum signals are received in a respective at least four different time slots. Each of the at least four time slots has a period less than about 0.20 milliseconds, but other time periods may be provided. The coding of the ranging signals may include both detection codes and tracking codes transmitted within a given time slot from a ground-based transmitter. The receiver generates a plurality of replica spread spectrum codes corresponding to the received codes. The coding is used to identify one given transmitter from another transmitter. Alternatively, time slot assignments are used to identify one transmitter from another transmitter so that a same or different code may be used.

In act 1918, the local positioning system is augmented by receiving GNSS signals in a different frequency band. The GNSS signals may be received at one receiver or two or more receivers for differential position determination. Different antennas are used for receiving the different frequency signals. For example, one or more microstrip patch antennas are used for receiving GNSS signals. A separate patch, microstrip, helix, or dipole antenna is used to receiver the ground-based transmitter ranging signals. The antennas may be offset or may be co-located. GNSS signals may be used to determine a range with sub-meter accuracy using carrier phase measurements. The augmentation allows determination of the position as a function of satellite signals as well as local positioning signals. Differential and/or RTK measurement of satellite signals may have a carrier wave based accuracy of better than 10 cm.

In act 1920, a position is determined as a function of ranges from a plurality of transmitters. Given the signal structure discussed above for act 1904, a range is estimated as a function of a non-differential code phase measurement of the detection and tracking codes. Carrier phase measurements may alternatively or additionally be used. The ranges are corrected for any troposphere delays.

The position may be determined within sub-meter accuracy using the local positioning system signals. The ranging signals are received at a substantially same center frequency, and the determination of position is free of required movement of the receiver. For example, the code has an accuracy of better than one meter, such as being better than about 10 cm. Having a chip width of less than 10 meters, sub-meter accuracy based on code phase measurements without carrier phase measurements is obtained with local positioning ranging signals. Given the centimeter level accuracy, troposphere delays may have a more significant adverse affect on position estimates than the meter level accuracy of a GNSS system.

For determining a more accurate range and corresponding position, a differential measurement (i.e., single or double difference range) is computed at the receiver as a function of different ranging signals from a same or different ground-based transmitters. The position is determined as a function of the differential measurements of the ranging signals between different receivers. For differential position solutions, information responsive to ranging signals received at one receiver, such as phase measurements or other temporal offset information, is communicated to another receiver.

The reference receiver and/or the mobile receiver estimate the range. The range is used to determine a position of the reference or mobile receiver. Estimated ranges from both receivers may be used to determine a position of both receivers.

Any combination of different ranging signals from different ground-based transmitters and/or satellites may be used. For differential measurement, a position vector from a reference station to a mobile receiver is determined as a function of ranges or code phase measurements of the reference station relative to the mobile receiver to the ground-based transmitters. A position is determined whether or not the mobile receiver is moving. Any combination of uses of ranging signals for determining position may be used, such as providing different position solutions based on a number of ground-based transmitters and satellites in view.

If the number of ranging signals from ground-based transmitters is greater than or equal to 4, the position solution is determined using the local positioning system. Using a greater number of ranging measurements to determine position may provide a more optimum dilution of precision. A more optimum dilution of precision results in a greater position accuracy. Using the full local positioning system solution, a highly accurate solution may be provided regardless of satellite availability. The code phase of the ranging signals discussed above with respect to FIG. 2 may provide centimeter level accuracy. The code phase noise is substantially equal to the carrier phase noise of a satellite signal, and the code phase does not have ambiguity over the region of operation. The code phase measurement for a single LPS transmitter is:

$$\phi_j^t = |q_j - x| + (1 - \dot{\phi}_j^{rt})\tau^t + v_j^t \qquad \text{Equation (1)}$$

where x is the desired, unknown position of the user, $\phi_j^t$ is the code phase measured from local transmitter j, characterized by code phase noise $v_j^t$. $\dot{\phi}_j^{rt}$ is the code phase rate, $q_j$ is the position of local transmitter j, and $\tau^t$ is the time offset of a mobile receiver with respect to a clock, which may or may not be synchronized to the GPS. All parameters are in a common unit of measure.

One way to find a solution to a set of measurements in the form of equation (1) is to linearize the measurements about an initial estimate, but other methods may be used. Linearizing (1) about an estimate of the position $\hat{x}$ gives:

$$\delta\phi_j^t = -\bar{e}_j^T \delta x + \left(1 - \dot{\phi}_j^{rt}\right)\tau^t + v_j^t \qquad \text{Equation (2)}$$

where, $$\bar{e}_j^T \equiv \frac{[q_j - \hat{x}_i]^T}{|q_j - \hat{x}_i|} \qquad \text{Equation (3)}$$

If there are $n_t$ LPS transmitters in track, the measurements may be combined in matrix form:

$$\begin{bmatrix} \delta\phi_1^t \\ \vdots \\ \delta\phi_{n_t}^t \end{bmatrix} = \begin{bmatrix} -\bar{e}_1^T & 1 - \dot{\phi}_1^{rt} \\ \vdots & \vdots \\ -\bar{e}_{n_t}^T & 1 - \dot{\phi}_{n_t}^{rt} \end{bmatrix} \begin{bmatrix} \delta x \\ \tau^t \end{bmatrix} + \begin{bmatrix} v_1^t \\ \vdots \\ v_{n_t}^t \end{bmatrix} \qquad \text{Equation (4)}$$

when $n_t \geq 4$, and the measurements are linearly independent (i.e., adequate DOP), the equations may be solved to derive the position using a linear least squares fit. If the code phase noise is a zero-mean Gaussian with standard deviation of 3 cm, then the resulting position solution may have an accuracy of 3 cm for DOP values of 1. The system of equations (4) may be solved using a single epoch of measurements when $n_t \geq 4$. To solve the system of equations, an initial estimate of $\hat{x}$ is entered, the linear least-squares method is applied to compute $\delta x$, the new value of $\delta x$ is entered for $\hat{x}$, and the process is repeated until the residual is negligible.

Figure 5:
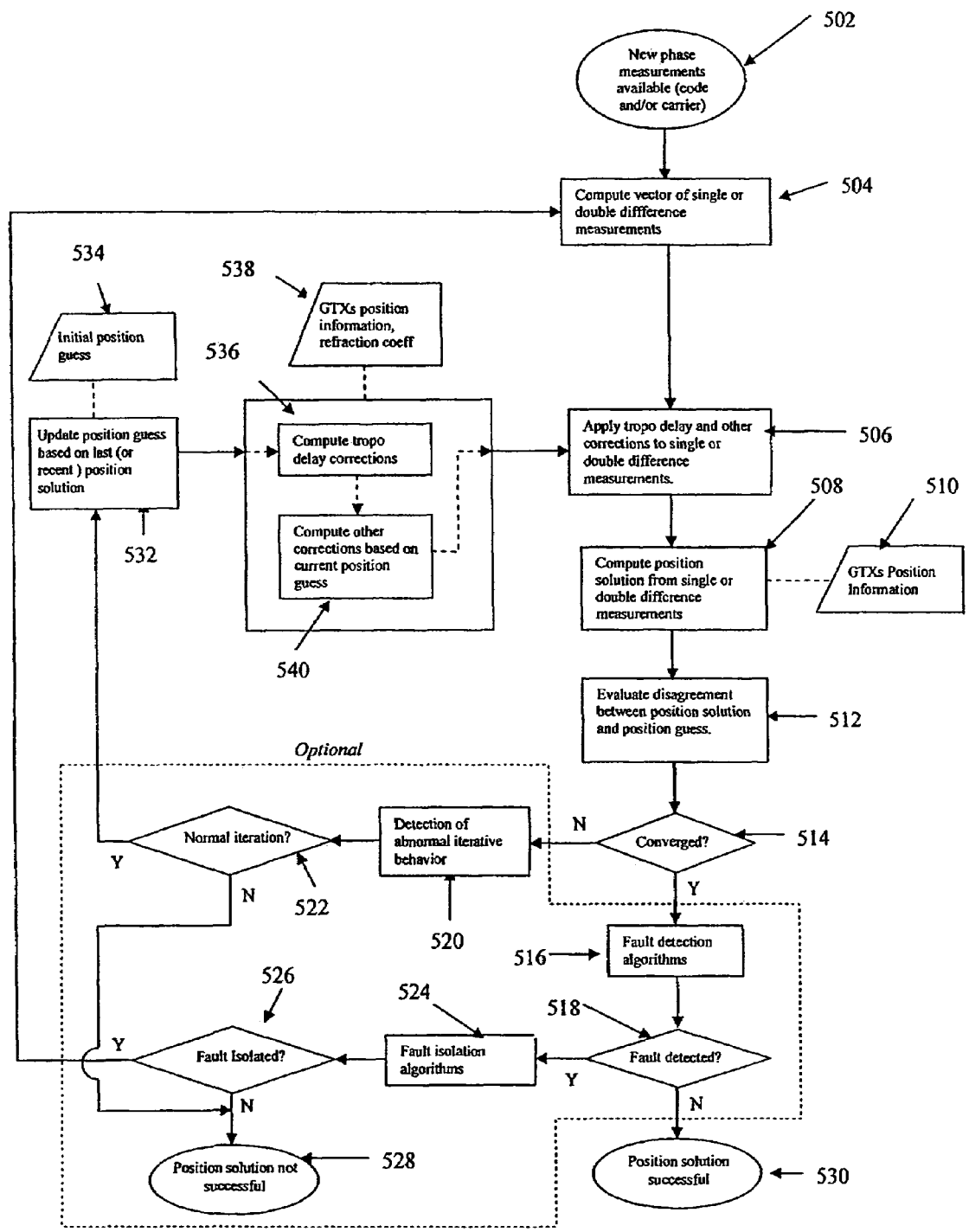
FIG. 5 is a flow chart diagram of one embodiment of a method for iterative troposphere correction in a ground-based transmitter positioning system.

FIG. 5 shows one embodiment of a method for determining positions with iterative application of troposphere corrections. Additional, different or fewer acts than shown may be used, such as not providing the fault detections for acts 518 or 522.

In act 502, phase measurements are available. The phase measurements are code, carrier or code and carrier phase measurements. The measurements are associated with a single epoch or measurement of the phase. The measurements are for one or more receivers from ranging signals of one or more transmitters.

In act 504, ranges are determined in a first pass of the iteration. A vector of pseudoranges is computed as a function the phase measurements. The ranges are ranges from a receiver to a transmitter or transmitters, single difference (i.e., differential) ranges or double difference ranges.

The ranges are estimated as a function of a position guess. For example, the range is estimated in a first pass as a function of a position from a previous time epoch. The position is determined in response to other measurements, such as an immediately previous position determination. As another example, the position guess is from a different position system, such as an inertial navigation system or a GNSS system.

In act 506, troposphere corrections are applied to the ranges. The troposphere corrections alter carrier and/or code phase measurements. The troposphere corrections weight the ranges. For example, the troposphere corrections are subtracted from or added to the ranges. As another example, the ranges are multiplied by the troposphere corrections. The troposphere corrections have better than 10, 5 or 1 centimeter accuracy. The accuracy of the troposphere corrections is the same or better than a desired accuracy of the ranges.

The same or different troposphere corrections are used for each range. For example, a different troposphere correction is provided for each different combinations of transmitters and receivers. The troposphere corrections apply to single transmitter-to-receiver ranges, or differential ranges (e.g., single or double difference ranges).

In act 536, the troposphere corrections are calculated. The troposphere corrections are distances, time delays, coefficients or other values. The position of the transmitters, a refraction coefficient, a temperature, a humidity, a pressure or other information is input in act 538. In act 532, an updated position guess is also input. For a first pass, the position guess is the initial position guess of act 534.

The troposphere corrections are a function of an altitude of the receiver and the transmitter, a distance between the ground-based transmitter and the receiver and other atmospheric characteristics (e.g., temperature and humidity). A simpler model may be used, such as a model not including altitude effects, or a more complex model may be used. For the first pass, the initial position guess for the receiver determines the distance between the ground-based transmitter and the receiver. The position of the ground-based transmitter is known from a survey or other position determinations.

When more recent meteorological data is available, the troposphere corrections may be updated or are calculated from the more recent data. As more exact or different locations of ground-based transmitters or reference receivers are available, the troposphere corrections may be updated or calculated from the more recent data.

In act 540, any other corrections to the range measurements are computed. For example, a correction may be applied in a differential system to account for line-of-sight differences from the reference station to a transmitter and from a mobile receiver to a transmitter. Another correction may be applied if there is known multipath at the base station or at a mobile receiver.

In act 508, the corrected ranges determine a position of the receiver in the current iteration, such as the first iteration. The known position of the ground-based transmitters used for the position determination is input in act 510. The ranges provide magnitudes of distance. The known positions of the transmitters are used to solve a possible position of the receiver and associated vectors.

In act 512, any disagreement between the position determined in act 508 and the current position guess is identified. If the positions different by more than a threshold amount, such as centimeters, a centimeter, millimeters (e.g., 10 millimeters), a millimeter or other amount, the solution is not converged in act 514.

If the solution is converged in act 514, any faults are detected to verify a correct solution. For example, corrected ranges used in the position determination are compared to the converged position, and a residual vector is computed that quantifies the differences. If the ranges are consistent with the position within a specified tolerance, no fault is detected in act 518. As another example, an augmented position (GNSS based position) is determined separately. If the augmented position is sufficiently close to the converged position, no fault is detected in act 518. If there is no fault, a successful position for the given epoch is output in act 530.

If there is a fault detected, any likely erroneous ranges are isolated in act 524. If a position solution based on different combinations of transmitters and receivers may be reached by discarding one or more ranges, the one or more ranges are identified as the source of faults in act 526. The pseudorange vector is computed again from the remaining ranges in act 504, without the isolated fault. If a source or error cannot be identified, the position solution may not be successfully reached in act 528.

In act 520, any abnormal iterative behavior is detected. For example, a limit on the number of iterations is examined. As another example, positions resulting in increasing or other unexpected divergence indicate abnormal iterative behavior. If the iteration is not normal in act 522, the process is ceased and no position solution is output in act 528. If the iteration is normal, the process continues to act 532.

In act 532, the position guess of the previous iteration is updated. For example, the position determined in act 508 from the previous iteration or pass is used as the current position guess. The current position guess is used to refine or recalculate the troposphere corrections in act 536 and the position estimates of act 508. The ranges are corrected for refined or updated troposphere delays in each iterative estimate of the ranges. For the subsequent passes, the troposphere corrected ranges are used to determine again a position in act 508.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for troposphere corrections in a positioning system with a ground based transmitter, the method comprising:

estimating a range as a function of a signal from the ground based transmitter, the signal:
(a) having an X-band or ISM-band carrier frequency;
(b) having a modulation rate of code being at least about 30 MHz; or
(c) having both the X-band or ISM-band carrier frequency and the modulation rate of the code being at least about 30 MHz; and applying a troposphere correction to the range.

2. The method of claim 1 wherein the signal has the modulation rate of the code of at least about 30 MHz.

3. The method of claim 2 wherein the signal has the modulation rate of the code of at least about 150 MHz.

4. The method of claim 1 wherein the signal has the X-band carrier frequency.

5. The method of claim 1 wherein the signal has the ISM band carrier frequency.

6. The method of claim 1 wherein estimating the range comprises estimating by a reference station.

7. The method of claim 1 wherein estimating the range comprises estimating from a mobile device.

8. The method of claim 1 wherein estimating the range comprises estimating from a single difference range and applying the troposphere correction comprises applying the troposphere correction to the single difference range.

9. The method of claim 1 wherein estimating the range comprises estimating from a double difference range and applying the troposphere correction comprises applying the troposphere correction to the double difference range.

10. The method of claim 1 wherein estimating the range comprises estimating from a carrier phase and applying the troposphere correction comprises applying the troposphere correction to a carrier phase range.

11. The method of claim 1 wherein estimating the range comprises estimating from a code phase and applying the troposphere correction comprises applying the troposphere correction to a code phase range.

12. The method of claim 1 wherein applying the troposphere correction comprises applying the troposphere correction with better than 10 centimeter accuracy.

13. The method of claim 12 wherein the at least 10 centimeter accuracy is 1 centimeter or better accuracy.

14. The method of claim 1 wherein applying the troposphere correction comprises calculating the troposphere correction as a function of an altitude of a receiver and a distance between the ground based transmitter and the receiver.

15. The method of claim 1 wherein applying the troposphere correction comprises applying the troposphere correction in a first iteration of estimating the range;
further comprising:
estimating the range in a subsequent iteration;
recalculating an additional troposphere correction; and
applying the additional troposphere correction to the range in the subsequent iteration.

16. The method of claim 1 wherein estimating the range comprises estimating from a differential range between reference receiver and a mobile receiver and applying the troposphere correction comprises applying the troposphere correction to the differential range.

17. The method of claim 1 further comprising:
receiving updated meteorological data associated with the ground based transmitter; and
updating the troposphere correction as a function of the meteorological data.

18. In a computer readable storage medium having stored therein data representing instructions executable by a programmed processor of a receiver for troposphere corrections in a positioning system with a ground based transmitter, the storage medium comprising instructions for:
estimating a range as a function of a signal from the ground based transmitter, the signal having an X-band or ISM-band carrier frequency and a modulation rate of code being at least about 30 MHz; and
applying a troposphere correction to the range.

19. The instructions of claim 18 wherein the signal has the modulation rate of the code of at least about 150 MHz and the X-band carrier frequency.

20. The instructions of claim 18 wherein estimating the range comprises estimating from a single or double difference range and applying the troposphere correction comprises applying the troposphere correction to the single or double difference range, respectively.

21. The instructions of claim 18 wherein estimating the range comprises estimating from a carrier or code phase and applying the troposphere correction comprises applying the troposphere correction to a carrier or code phase range.

22. The instructions of claim 18 wherein applying the troposphere correction comprises applying the troposphere correction with better than 5 centimeter accuracy.

23. The instructions of claim 18 wherein applying the troposphere correction comprises calculating the troposphere correction as a function of an altitude of a receiver and a distance between the ground based transmitter and the receiver.

24. The instructions of claim 18 wherein applying the troposphere correction comprises applying the troposphere correction in a first iteration of estimating the range;
further comprising:
estimating the range in a subsequent iteration;
recalculating an additional troposphere correction; and
applying the additional troposphere correction to the range in the subsequent iteration.

25. The instructions of claim 18 wherein estimating the range comprises estimating from a differential range between a reference receiver and the receiver with the programmed processor and applying the troposphere correction comprises applying the troposphere correction to the differential range.

26. The instructions of claim 18 further comprising:
receiving updated meteorological data associated with the ground based transmitter; and
updating the troposphere correction as a function of the meteorological data.

* * * * *